United States Patent [19]
Gradle

[11] Patent Number: 6,164,324
[45] Date of Patent: Dec. 26, 2000

[54] ADJUSTABLE QUICK CLOSING DISK CHECK VALUE WITH FLOW INDICATOR

[75] Inventor: Richard Joseph Gradle, Garner, N.C.

[73] Assignee: Edward Vogt Valve Company, Raleigh, N.C.

[21] Appl. No.: 09/404,680

[22] Filed: Sep. 23, 1999

[51] Int. Cl.$^7$ .................................................. F16K 37/00
[52] U.S. Cl. ........................ 137/554; 137/527; 137/527.8
[58] Field of Search .................................... 137/553, 556, 137/554, 527, 527.8

[56] References Cited

U.S. PATENT DOCUMENTS

| | | | |
|---|---|---|---|
| 3,857,277 | 12/1974 | Moore | 73/28 |
| 3,914,994 | 10/1975 | Banner | 73/118 |
| 4,690,168 | 9/1987 | Kihm | 137/554 |
| 4,805,665 | 2/1989 | League | 137/554 |
| 4,926,903 | 5/1990 | Kawai | 137/554 |
| 5,086,273 | 2/1992 | Leon | 324/207 |
| 5,140,263 | 8/1992 | Leon | 324/207.17 |
| 5,228,342 | 7/1993 | McShane | 73/597 |
| 5,236,011 | 8/1993 | Casada et al. | 137/554 |
| 5,305,787 | 4/1994 | Thygesen | 137/527 |
| 5,348,270 | 9/1994 | Dinh | 137/553 X |
| 5,471,138 | 11/1995 | Glass, III et al. | 324/207.19 |
| 5,504,426 | 4/1996 | Ricci et al. | 324/207.17 |
| 5,609,183 | 3/1997 | Parker | 137/554 |
| 5,609,184 | 3/1997 | Apel et al. | 137/554 |
| B1 5,086,273 | 3/1994 | Leon | 324/207.17 |

OTHER PUBLICATIONS

Article entitled Features and Descriptions of Edward One-Piece Tilting Disk Check Valves.

Primary Examiner—Kevin Lee
Attorney, Agent, or Firm—Myers Bigel Sibley & Sajovec

[57] ABSTRACT

A check valve includes: a valve body having an inlet, an outlet, and an internal cavity, wherein the inlet, outlet and cavity are in fluid communication and define a flow path; a disk positioned within the cavity, a hinge pin assembly pivotally interconnecting the valve body and the disk; a biasing device associated with the disk for biasing the disk toward the closed position; and an indicator associated with the hinge pin assembly and attached to the valve body. The disk pivots about a pivot axis between a closed position, in which the disk contacts a seat surface within the cavity, thereby preventing fluid flow along the flow path between the inlet and the outlet, and an open position, in which the disk does not contact the seat surface, thereby enabling fluid flow along the flow path between the inlet and the outlet. The hinge pin assembly includes: a substantially cylindrical hinge pin having a longitudinally-extending bore formed therein and attached to one of the disk and the valve body; and a substantially cylindrical hinge pin core attached to the other of the disk and the valve body. The hinge pin extends substantially parallel to the pivot axis, and the hinge pin bore is eccentrically located within the hinge pin. The hinge pin core extends within the hinge pin bore substantially parallel to the pivot axis. The hinge pin assembly also includes structure eccentrically and rotatably mounting the hinge pin to one of the valve body and the disk. The indicator, preferably an indicator member, extends through a bore in the hinge pin core and is attached to the disk and an indicating device, such as a rheostat or dial, mounted on the valve body.

24 Claims, 5 Drawing Sheets

ADJUSTABLE QUICK CLOSING DISK CHECK VALUE WITH FLOW INDICATOR

FIELD OF THE INVENTION

The present invention relates generally to valves and more particularly to flow indicators for valves.

BACKGROUND OF THE INVENTION

Valves are common components of almost any piping system. Although they can be constructed in many different configurations and sizes, a typical valve will include a few basic elements. These include: a valve body that houses internal components within an internal cavity; inlet and outlet pipes leading to and from the valve body; and a valve member that is positioned within the cavity of the valve body. These components are attached such that fluid entering the valve through the inlet pipe is either allowed to flow through to the outlet pipe by the valve member or prevented from such flow based on the orientation of the valve member within to the valve body.

One type of valve commonly used in some piping systems is the quick closing disk check valve, which is typically employed in systems in which reverse flow through the valve is undesirable. A quick closing disk check valve is typically constructed with a generally circular disk that pivots on hinge pins mounted within the body of the valve. A portion of one surface of the disk rests against a seating surface located in the body of the valve when the valve is in the closed position. The disk pivots about the hinge pins away from the seating surface in response to the flow of fluid through the inlet and outlet ports of the valve. Pivoting of the disk about the hinge pins away from the closed position is resisted by helical springs that surround the hinge pins or other rotation-resisting devices, such as a counterbalancing weight attached to the disk.

One specific problem that can occur with a quick closing disk check valve is misalignment of the disk relative to the seating surface. Because the disk and seating surface form a seal, it is important that the contact between these components be as complete as possible. This can be accomplished by locating the disk properly relative to the seating surface. If, on the other hand, the disk is mounted in a misaligned condition, the seal may be inadequate for the system in which it is installed. Because the tolerances for the seat are quite narrow, proper mounting can be quite difficult to achieve.

One solution offered to address the problem of misalignment is the use of adjustable hinge pins. In this configuration, the hinge pins include both a hollow outer hollow hinge pin and an inner hinge pin core that fits within a bore in the hinge pin and is rotatably adjustable relative to the outer hinge pin within that bore. The hinge pin core is rotatably attached to bearings mounted in the valve disk, and the hinge pin is mounted to the valve body. The centerline of the bore extending through the hinge pin is offset slightly (about 0.105") from the centerline of the hinge pin itself. Also, the hinge pin core is eccentrically mounted onto the disk with a similar 0.105" offset. As a result, rotation of either (a) the hinge pin core within the outer hinge pin or (b) the outer hinge pin relative to the valve body within which it is mounted moves the bearing end of the hinge pin core (and, in turn, the disk) relative to the housing. Thus, the position of the disk relative to the valve seat can be adjusted within a circle of having a diameter of approximately 0.4".

One difficulty with the adjustable hinge pin design (and other quick closing disk check valves) is determining the angle or position to which the disk pivots during fluid flow. Being able to monitor this parameter can be important in determining and regulating volumetric flow. It is important that any sort of device that performs this function operate reliably and without interfering with the operation of the valve itself. Also, such a device should be easily read.

SUMMARY OF THE INVENTION

In view of the foregoing, it is an object of the present invention to provide a quick closing disk check valve that enables the volume of fluid flow to be monitored during operation of the valve.

It is also an object of the present invention to provide a quick closing disk check valve with the adjustable hinge pin design described above that monitors fluid flow during operation.

These and other objects of the present invention are satisfied by the present invention, which is directed to a disk check valve having an indicator that shows the angular position of the disk. The check valve of the present invention comprises: a valve body having an inlet, an outlet, and an internal cavity, wherein the inlet, outlet and cavity are in fluid communication and define a flow path; a disk positioned within the cavity, a hinge pin assembly pivotally interconnecting the valve body and the disk; biasing means associated with the disk for biasing the disk toward the closed position; and an indicator associated with the hinge pin assembly and attached to the valve body. The disk pivots about a pivot axis between a closed position, in which the disk contacts a seat surface within the cavity, thereby preventing fluid flow along the flow path between the inlet and the outlet, and an open position, in which the disk does not contact the seat surface, thereby enabling fluid flow along the flow path between the inlet and the outlet.

The hinge pin assembly comprises: a substantially cylindrical hinge pin having a longitudinally-extending bore formed therein and attached with the valve body; and a substantially cylindrical hinge pin core attached to the disk and the valve body. The hinge pin extends substantially parallel to the pivot axis, and the hinge pin bore is eccentrically located within the hinge pin. The hinge pin core extends within the hinge pin bore substantially parallel to the pivot axis. The hinge pin assembly also includes means for eccentrically and rotatably mounting the hinge pin relative to the valve body.

The indicator is responsive to pivotal movement of the disk and indicates the pivotal position of the disk. In a preferred embodiment, the indicator includes an indicator member that extends through an eccentrically-positioned bore in the hinge pin core. One end of the indicator member is attached to and pivots with the disk. The opposite end of the indicator member is attached to an indicating device, such as a rheostat, potentiometer, digital encoder, or mechanical dial, that represents the angular position of the disk.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
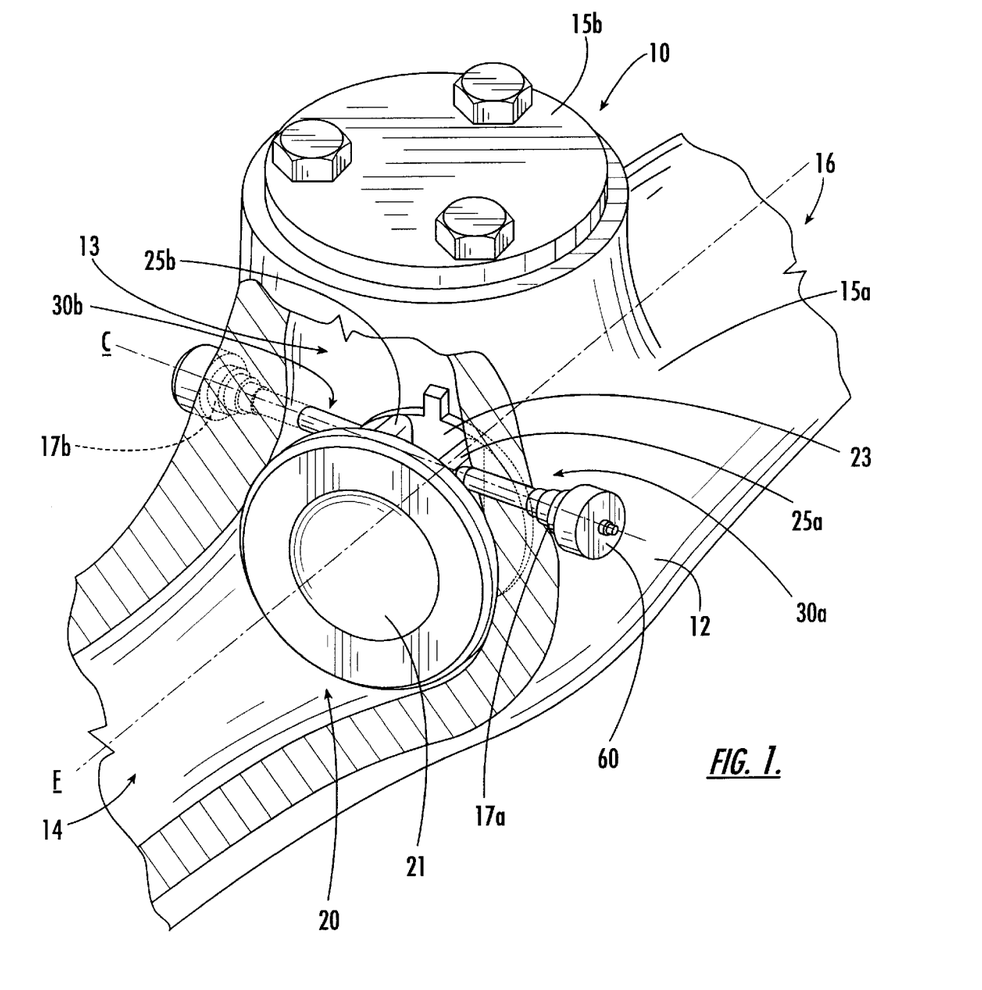
FIG. 1 is a cutaway perspective view of a quick closing disk check valve of the present invention.

Referring now to FIG. 1, a quick closing disk check valve, broadly designated at 10, is illustrated therein. The valve 10 comprises a body 12, a disk assembly 20, hinge pin assemblies 30a, 30b that pivotally interconnect the disk assembly 20 to the body 12, and a rheostat 60. Each of these components is discussed in detail hereinbelow.

The body 12 is generally hollow and includes a cavity 13 within which the disk assembly 20 is positioned. The cavity 13 is formed by generally circular walls 15a which are covered by a cover 15b. An inlet 14 leads into one side of the cavity 13, and an outlet 16 exits the opposite side of the cavity 13. The inlet 14 and outlet 16 define a flow path F. The walls 15a include two apertures 17a, 17b positioned on opposite sides thereof through which the hinge pin assemblies 30a, 30b extend. A circumferential body seat 18 is positioned at the downstream edge of the inlet 14 and is oriented to be normal to the flow path F (FIGS. 2A and 2B).

The body 12 is typically formed of steel or other metals, but may be formed from other materials, such as polymeric materials, as the proposed environment and use of the valve 10 dictate. The body 12 is typically manufactured by casting or machining, and may be formed of a single unitary piece or from multiple pieces welded or otherwise interconnected.

Figure 2A:
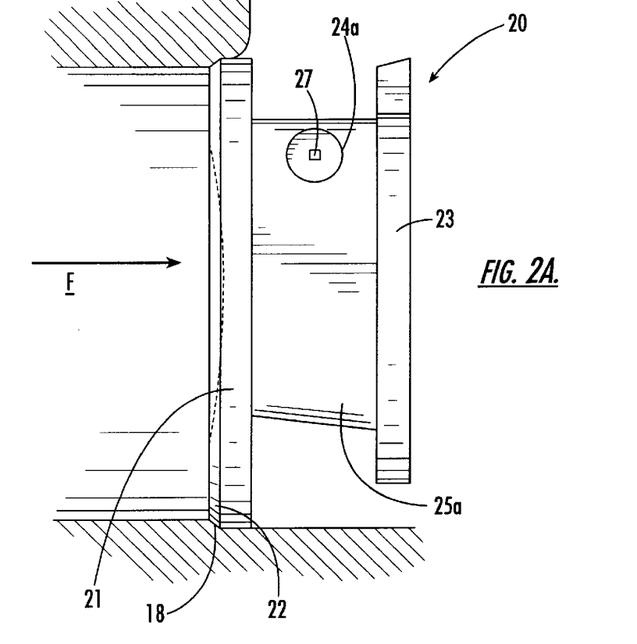
FIG. 2A is a side cross section of the valve of FIG. 1 illustrating the disk in its closed position.
Figure 2B:
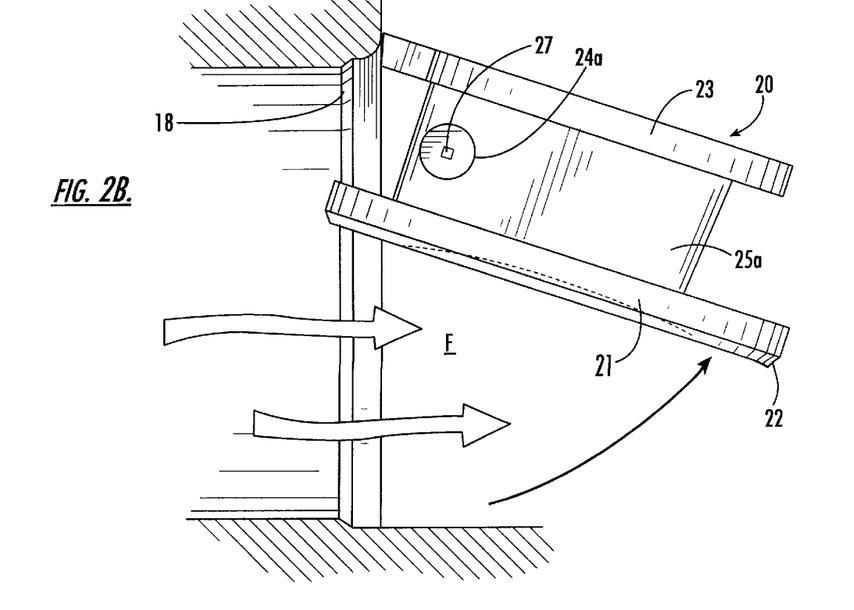
FIG. 2B is a side section view of the valve of FIG. 1 showing the disk pivot to an open position.

Referring to FIGS. 1, 2A and 2B, the disk assembly 20 includes a generally circular disk 21 having a circumferential seat 22, which is configured and positioned to confront and contact the seat surface 18 of the body 12. A counterweight 23 is connected to the disk 21 opposite the seat 22 via a pair of connecting legs 25a, 25b. A bearing 24 is located in the lateral face of each connecting leg 25a, 25b (only one is shown herein). A square nub 27 is located in each bearing 24a, 24b. Suitable materials for the disk assembly 20 include steel, aluminum, and other metals, and polymeric materials; the material for the disk 21 is generally chosen based on the type of fluid expected to flow through the valve 10 and the temperature and pressure of the fluid. The bearings 24a, 24b should be formed of an abrasion-resistant material known to those skilled in this art to be suitable for bearing use.

The disk assembly 20 is pivotally mounted within the cavity 13 through rotatable interaction between the hinge pin assemblies 30a, 30b and the hinge pin bearings 24a, 24b. The disk assembly 20 is movable between a closed position (FIG. 2A), in which the disk seat 22 of the disk 21 contacts the body 18, and an open position (FIG. 2B), in which the contact surface 22 has pivoted away from the seat surface 18 to allow fluid to flow along the flow path F. Typically, the movement of the disk 21 to the open position results from the flow of fluid into the inlet at a pressure sufficient to force the disk assembly 20 to pivot. The counterweight 23 acts to counteract the pressure of fluid flow and to bias the disk assembly 20 toward the closed position. Although the counterweight 23 is illustrated herein, those skilled in this art will recognize that other means for biasing the disk assembly 20 toward the closed position, such as mechanical springs, pneumatic or magnetic devices, and the like, may also be used with the present invention.

In some instances, one of the body seat 18 or disk seat 22 will be covered with a sealing material (not shown), which is typically a compressible elastomer that improves the seal between the disk seat 22 and the body seat 18 when the disk assembly 20 is in the closed position. Suitable seating materials include poly (ether ether ketone) (PEEK) and perfluoroelastomers such as Kalrez® resins available from DuPont Dow Elastomers, Wilmington, Delaware.

The hinge pin assemblies 30a, 30b extend through the apertures 17a, 17b in the walls 15a, 15b and into the bearing 24 of the disk assembly 20. As noted, the rotatable mounting of the bearing 24 on the hinge pin assemblies 30a, 30b enables the disk assembly 20 to pivot relative to the body 12.

Figure 3:
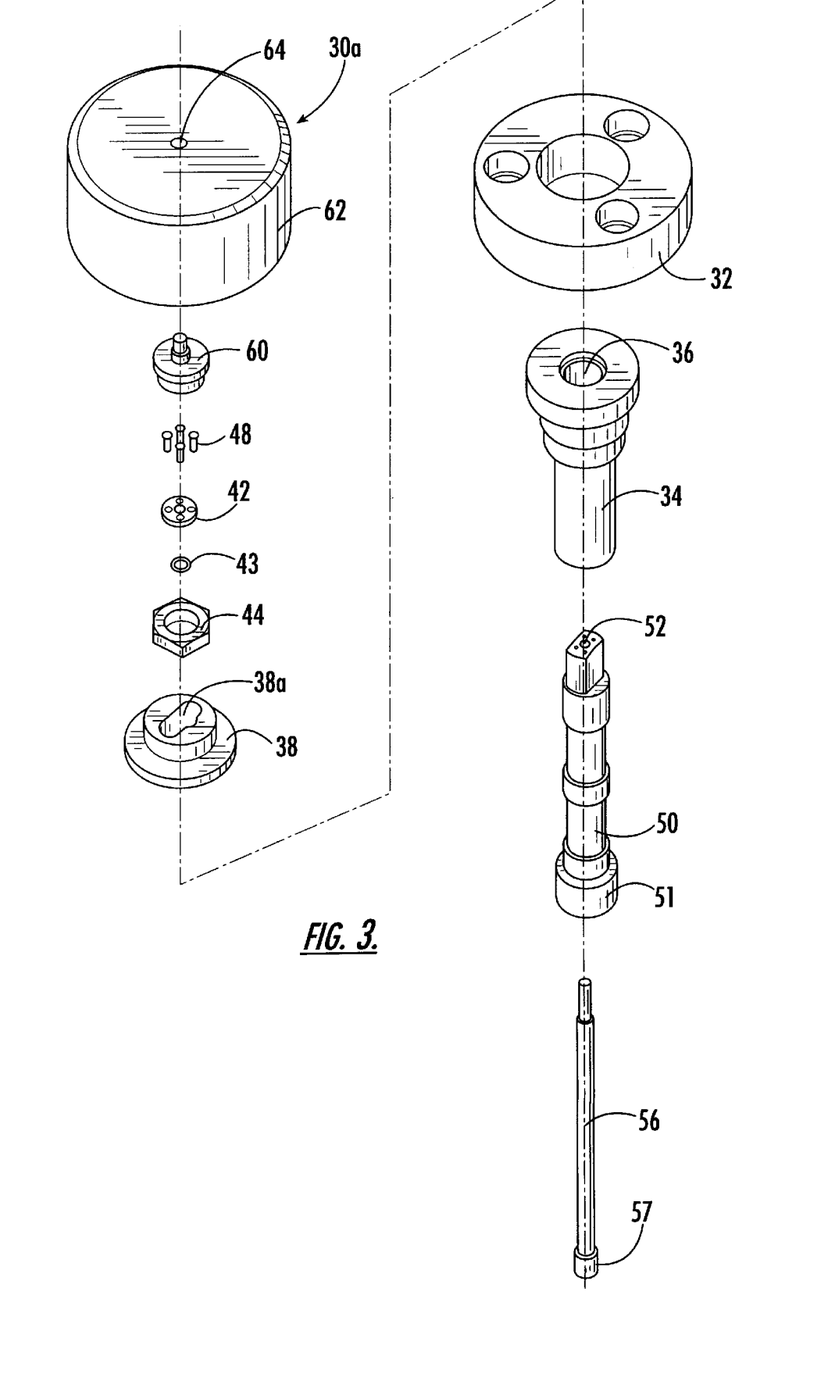
FIG. 3 is an exploded view of a hinge pin-indicator assembly of the present invention.
Figure 4:
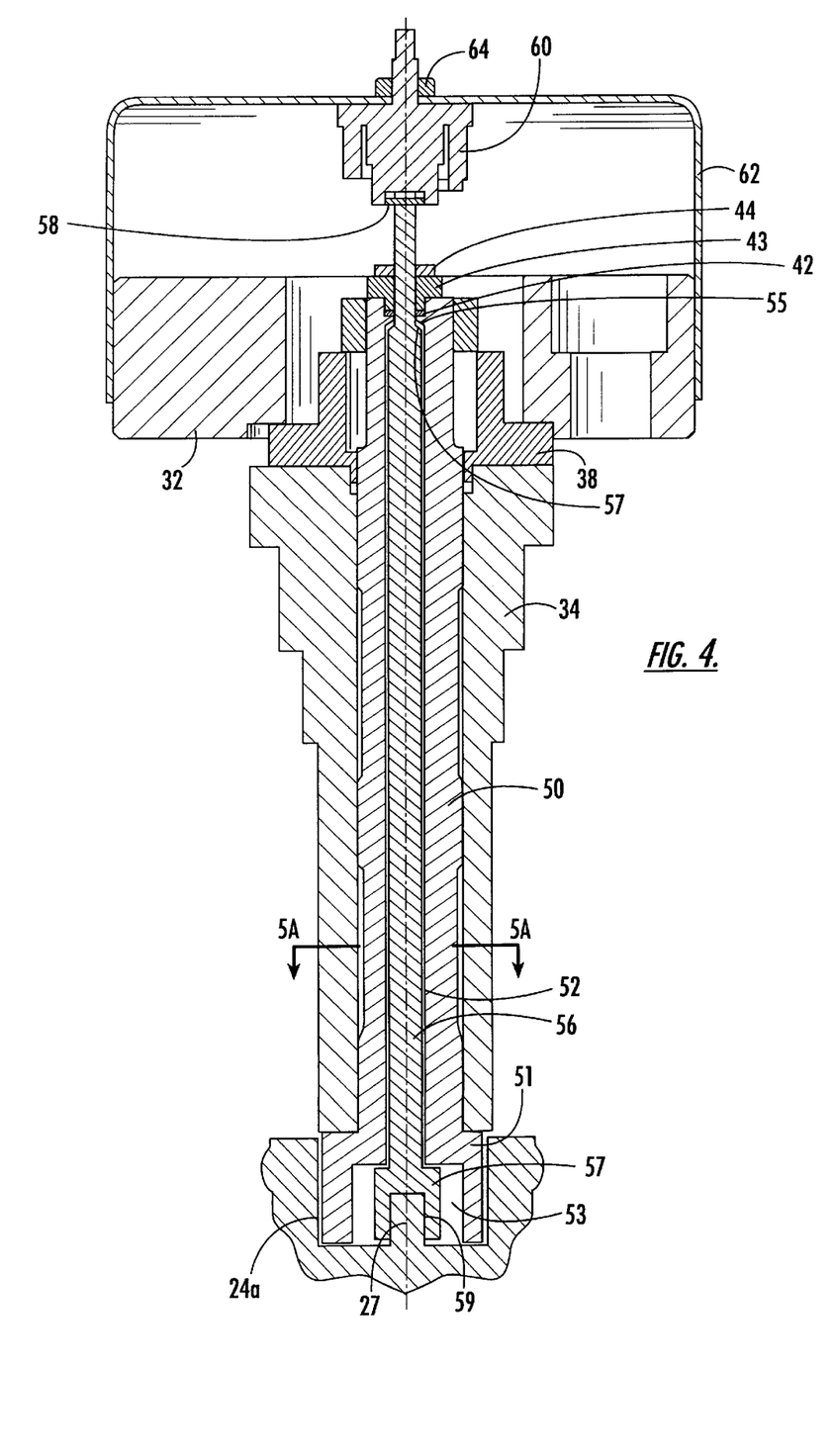
FIG. 4 is a section view of the assembled hinge pin assembly of FIG. 3

Turning now to FIGS. 3 and 4, the hinge pin assembly 30a is illustrated therein (the hinge pin assembly 30b is a mirror image of the hinge pin assembly 30a, so the ensuing discussion is equally applicable to the hinge pin assembly 30b). The hinge pin assembly 30a includes a hinge pin 34, a hinge pin core 50, and an indicator rod 56. The hinge pin 34, which is generally cylindrical with a stepped outer surface, includes a longitudinally extending hinge pin bore 36 extending through its length parallel to the longitudinal axis of the hinge pin 34; notably, the hinge pin bore 36 is eccentrically located within the hinge pin 34, such that its longitudinal axis is offset from the longitudinal axis (typically this offset is between about 0.050 and 0.150 inches, and preferably the offset is between about 0.100 and 0.110 inches).

The hinge pin core 50 is also substantially cylindrical and fits within the hinge pin bore 36. The hinge pin core 50 also includes a longitudinal bore 52 that extends the length of the hinge pin core 50 and is eccentrically positioned such that its longitudinal axis is offset relative to a longitudinal axis extending through the center of the hinge pin core 50. The extent of this offset is as described above for the hinge pin 34. The hinge pin core 50 includes a knob 51 at one end that abuts the narrow end of the hinge pin 34 and prevents relative longitudinal movement of the hinge pin 34 and hinge pin core 50. A recess 53 is located within the knob 51 that merges with the bore 52. At the end of the hinge pin core 50 opposite the recess 53, the bore 52 is narrowed at a shoulder 55. The hinge pin core 50 is of sufficient length that, when it is inserted in the hinge pin bore 36 such that the knob 53 abuts the end of the hinge pin 34, the hinge pin core 50 extends beyond the wider end of the hinge pin 34.

The indicator rod 56 extends through the bore 52 of the hinge pin core 50. A knob 57 positioned on one end of the indicator rod 56 resides within the recess 53 of the hinge pin core 50; the knob includes a square recess 59 that is sized and configured to mate with the nub 27 located in the recess of the bearing 24a of the disk assembly 20. At the opposite end, the indicator rod 56 extends beyond the narrow end of the hinge pin core 50. The indicator rod 56 narrows at this end at a ridge 57 that abuts the shoulder 55; this abutment and the abutment of the knob 57 in the recess 53 prevents longitudinal movement of the indicator rod 56 toward the narrow end of the hinge pin core 50.

The subassembly comprising the hinge pin 34, the hinge pin core 50 and the indicator rod 56 are interconnected to the body 12 in the following manner. A circular clamp 38 abuts the wider end of the hinge pin 34 and includes an aperture 38*a* through which the hinge pin core 50 and indicator rod 56 extend. A disk shaped hinge pin retainer 32 abuts the shoulder of the clamp 38. The hinge pin retainer 32 is attached to the wall 15*a* through large bolts. The clamp 38 is positioned between the wider end of the hinge pin 34 and a nut 44 that is threaded onto the narrower end of the hinge pin core 50. An O-ring 43 is positioned near the narrow end of the hinge pin core 50. An O-ring gland 42 abuts the narrow end of the hinge pin core 50, maintains the O-ring 53 in place, and receives the narrower end of the indicator rod 56. The O-ring gland 42 is secured in place with gland bolts 48. The indicator rod 56 then extends to meet the rheostat 60; it is rotatably mounted thereto via a pin 58. The rheostat 60 is then mounted within a housing 62 that covers the rheostat 60 and the hinge pin retainer 32. Notably, the rheostat 60 extends through an aperture 64 in the housing 62 that is slightly larger than the portion of the rheostat 60 that extends through the housing 62 in order to enable the rheostat 60 to be slidably adjustable relative to the housing 62.

At its opposite end, the hinge pin assembly 30*a* is mounted to the disk assembly 20 through insertion of the knob 51 of the hinge pin core 50 into the bearing 24*a*. The square nub 27 located in the bearing 24*a* is received within the square recess 59 of the indicator rod 56. As such, rotation of the disk assembly 20 also causes the indicator rod 56 to rotate. In contrast, the outer surface of the hinge pin core 50 fits within the bearing 24*a* to enable the disk assembly 20 to rotate while the hinge pin core 50 remains fixed.

Figures 5A, 5B:
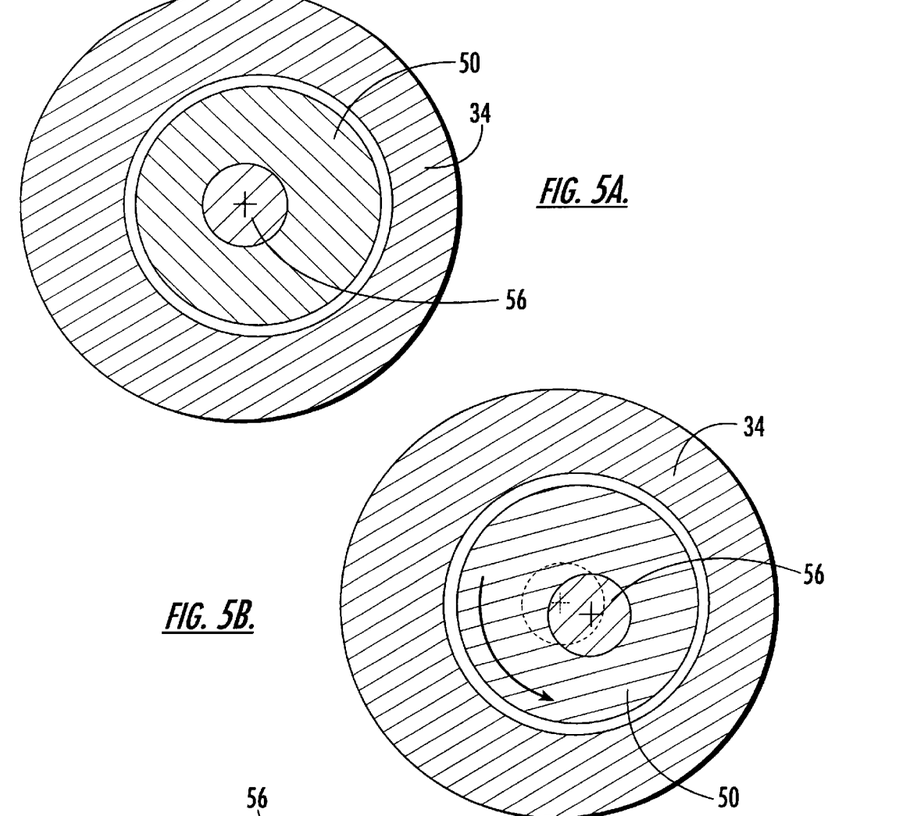
FIG. 5A is a section view taken along the lines of FIG. 4 illustrating the hinge pin and hinge pin core in a centered position.
FIG. 5B illustrates the rotation of the hinge pin core 90 degrees counterclockwise relative to the hinge pin to shift the axis of the rotation of the valve disk to the right.
Figure 5C:
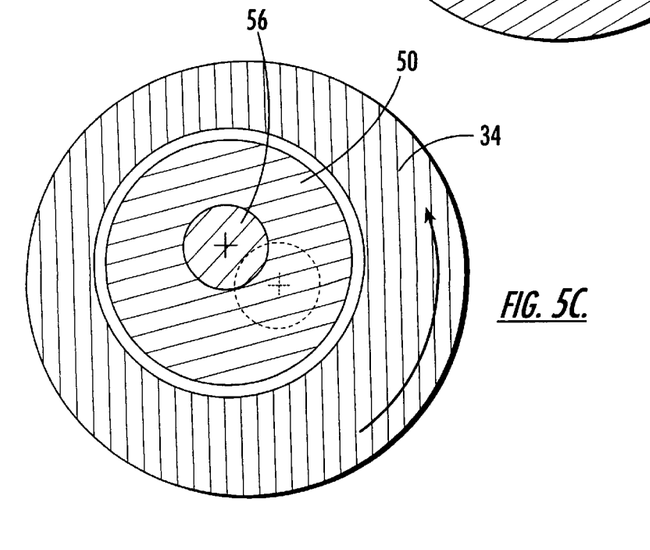
FIG. 5C illustrates the rotation of the hinge pin 90 degrees counterclockwise relative to the valve body to illustrate the movement of the hinge pin axis upwardly and to the left.

As discussed above, when the disk assembly 20 is installed in the body 12, it is important that the disk seat 22 properly contact the body seat 18. This relationship is affected by the position of the disk 21 (and, hence, the disk assembly 20) relative to the contact surface 18. The position of the disk 21 can modified adjusting the rotational relationship of (a) the hinge pin 34 relative to the body walls 15*a* and (b) the hinge pin core 50 relative to the hinge pin 34. The movement of the disk assembly 20 relative to the walls 15*a* can be understood with reference to FIGS. 5A through 5C. FIG. 5A illustrates a "centered" position of the disk assembly 20. In this position, the thicker section portion of the hinge pin 34 is positioned to the left of the center of the indicator rod 56 (as seen in FIG. 5A) and the thicker section of the hinge pin core 50 is positioned to the right of the center of the indicator rod 56. As a result, their "offsets" serve to cancel out one another, and the pivot axis C of the disk 21 (which is shown in FIG. 1 and coincides with the longitudinal center of the indicator rod 56) is located in the geometric center of the hinge pin 34.

If the relationship of the disk seat 22 and the body seat 18 is such that the pivot axis should be shifted to the right (from the view shown in FIG. 5), the hinge pin core 50 can be rotated within the bore 36 of the hinge pin core 34 such that the larger portions of both the hinge pin core 50 and the hinge pin 34 are positioned to the left of the center of the indicator rod 56 (see FIG. 5B). This action shifts the pivot axis C (and, in turn, the disk assembly 21) to the right. If instead it is desired to shift the pivot axis of the disk 21 to the left, the hinge pin 34 is rotated relative to the hinge pin retainer 32 such that the larger portion of the hinge pin 34 is positioned to the right of the center of the indicator rod 56 (see FIG. 5C). Again, this action shifts the pivot axis C and the disk assembly 21 to the left. Those skilled in this art will recognize that, although only two alternative positions for the pivot axis C are illustrated herein, there are any number of alternative positions for the pivot axis based on combined rotations of the hinge pin 34 and hinge pin axis 50; essentially, any position (left, right up or down) within a circle having a diameter equal to the sum of the offsets of the hinge pin 34 and the hinge pin core 50 can be achieved Notably, the rheostat 60 moves relative to the housing 62 in the same manner as the disk assembly 20. This movement is possible because aperture 64 is larger than the diameter of the rheostat 60, thereby allowing the rheostat 60 to slide relative to the housing 62 as necessary.

After the hinge pin 34 and hinge pin core 50 have been rotated to the desired positions such that the disk 21 is properly positioned relative to the seat surface 18, the hinge pin 34 and hinge pin core 50 are secured by tightening the large bolts for the hinge pin retainer 32. This action fixes the hinge pin 34 and hinge pin core 50 in place relative to the walls 15*a*. The disk assembly 20 is free to rotate relative to the hinge pin core 50 upon which it is mounted.

Even after the hinge pin 34 and hinge pin core 50 are secured, the indicator rod 56 is still free to rotate relative to the hinge pin core 50. Thus, rotation of the disk assembly 20 causes the indicator rod 56 to rotate about the pivot axis C through an angle that is essentially identical to the angle of rotation of the disk assembly 20. At the end of the indicator rod 56 attached to the rheostat 60, rotation of the indicator rod 56 causes the rheostat 60 to rotate and transmit an electrical signal that corresponds to the magnitude of the angular rotation of the disk assembly 20. This signal is typically processed and displayed on a dial, LED, computer screen or other visual indicator (not shown). Those skilled in this art will recognize that, although the illustrated rheostat 60 is preferred, other indicating devices, such as mechanical dials and bars, potentiometers, digital encoders, other electric devices, and the like, that can translate the rotation of the indicator rod 56 into an indication of angular movement, may also be suitable for use with the present invention. It should also be noted that the present invention can also be connected with a computer or other recording device for displaying or recording the angular movement of the disk assembly 20 during operation.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein. In the claims, means-plus-function clauses are intended to cover the structures described herein as performing the recited function and not only structural equivalents but also equivalent structures.

That which is claimed is:

1. A check valve, comprising:
   a valve body having an inlet, an outlet, and an internal cavity, said inlet, said outlet and said cavity being in fluid communication and defining a flow path, said cavity including a seat surface associated with said flow path;

a disk positioned within said cavity;

a hinge pin assembly pivotally interconnecting said valve body and said disk such that said disk pivots about a pivot axis between a closed position, in which said disk contacts said seat surface, thereby preventing fluid flow along said flow path from said outlet to said inlet, and an open position, in which said disk does not contact said seat surface, thereby enabling fluid flow along said flow path between said inlet and said outlet, said hinge pin assembly comprising:

a substantially cylindrical hinge pin having a longitudinally-extending bore formed therein, said hinge pin being attached with said valve body and extending substantially parallel to said pivot axis, said hinge pin bore being eccentrically located within said hinge pin;

a substantially cylindrical hinge pin core attached with said disk and said valve body and extending within said hinge pin bore substantially parallel to said pivot axis; and means for eccentrically and rotatably mounting said hinge pin relative to said valve body;

biasing means associated with said disk for biasing said disk toward the closed position; and an indicator associated with said hinge pin assembly and attached to said valve body, said indicator being responsive to pivotal movement of said disk and indicating the pivotal position of said disk.

2. The check valve defined in claim 1, wherein said indicator comprises a rheostat.

3. The check valve defined in claim 2, wherein said hinge pin core includes a longitudinally extending bore therein, and wherein said hinge pin assembly further comprises an indicator member attached to said rheostat and positioned in said bore for rotational movement relative thereto.

4. The check valve defined in claim 3, wherein said hinge pin is fixed to said valve body, and said disk is rotatably mounted to said hinge pin core.

5. The check valve defined in claim 4, wherein said indicator member is attached to said disk.

6. The check valve defined in claim 3, wherein said hinge pin core bore is offset between about 0.050 and 0.150 inches from the longitudinal axis of said hinge pin core.

7. The check valve defined in claim 6, wherein said hinge pin bore is offset between about 0.050 and 0.150 inches from the longitudinal axis of said hinge pin.

8. The check valve defined in claim 2, further comprising a readout device operably attached to said rheostat.

9. The check valve defined in claim 3, wherein said hinge pin core includes a recess at one end, and said indicator member includes a knob at one end that resides within said countersunk recess.

10. The check valve defined in claim 1, wherein said biasing means comprises a counterweight attached to said disk.

11. The check valve defined in claim 3, wherein said indicator is configured to transmit an electrical signal corresponding to the angular rotation of said indicator member.

12. A check valve, comprising:

a valve body having an inlet, an outlet, and an internal cavity, said inlet, said outlet and said cavity being in fluid communication and defining a flow path, said cavity having a seat surface associated with said flow path;

a disk positioned within said cavity;

a hinge pin assembly pivotally interconnecting said valve body and said disk such that said disk pivots about a pivot axis between a closed position, in which said disk contacts said seat surface, thereby preventing fluid flow along said flow path between said inlet and said outlet, and an open position, in which said disk does not contact said seat surface, thereby enabling fluid flow along said flow path between said inlet and said outlet, said hinge pin assembly comprising:

a substantially cylindrical hinge pin having a longitudinally-extending bore formed therein, said hinge pin being rotatably mounted to said valve body and extending substantially parallel to said pivot axis, said hinge pin bore being eccentrically located within said hinge pin;

a substantially cylindrical hinge pin core rotatably mounted to said disk and extending within said hinge pin bore substantially parallel to said pivot axis and being rotatably mounted therein, said hinge pin core including a longitudinally extending bore eccentrically located within said hinge pin core;

an indicator member attached to said disk and extending longitudinally within said bore of said hinge pin core;

means for eccentrically and rotatably mounting said hinge pin to one of said valve body and said disk; and biasing means for biasing said disk toward the closed position; and an indicator associated with said indicator member, said indicator being responsive to rotation of said indicator member, said indicator being attached to said valve body.

13. The check valve defined in claim 12, wherein said hinge pin core bore is offset between about 0.050 and 0.150 inches from the longitudinal axis of said hinge pin core.

14. The check valve defined in claim 13, wherein said hinge pin bore is offset between about 0.050 and 0.150 inches from the longitudinal axis of said hinge pin.

15. The check valve defined in claim 12, further comprising a display device operably attached to said indicator.

16. The check valve defined in claim 12, wherein said hinge pin core includes a recess at one end, and said indicator member includes a knob at one end that resides within said recess.

17. A check valve, comprising:

a valve body having an inlet, an outlet, and an internal cavity, said inlet, said outlet and said cavity being in fluid communication and defining a flow path, said cavity having a seat surface associated with said flow path;

a disk positioned within said cavity;

a hinge pin assembly pivotally interconnecting said valve body and said disk such that said disk pivots about a pivot axis between a closed position, in which said disk contacts said seat surface, thereby preventing fluid flow along said flow path between said inlet and said outlet, and an open position, in which said disk does not contact said seat surface, thereby enabling fluid flow along said flow path between said inlet and said outlet, said hinge pin assembly comprising:

a substantially cylindrical hinge pin having a longitudinally-extending bore formed therein, said hinge pin being rotatably mounted to said valve body and extending substantially parallel to said pivot axis, said hinge pin bore being eccentrically located within said hinge pin;

a substantially cylindrical hinge pin core rotatably mounted to said disk and extending within said hinge pin bore substantially parallel to said pivot axis and being rotatably mounted therein, said hinge pin core including a longitudinally extending bore eccentrically located within said hinge pin core;

an indicator member attached to said disk and extending longitudinally within said bore of said hinge pin core;

means for eccentrically and rotatably mounting said hinge pin to one of said valve body and said disk; and biasing means for biasing said disk toward the closed position; and a rheostat attached to said indicator member, said rheostat being responsive to rotation of said indicator member, said rheostat being attached to said valve body.

18. The check valve defined in claim 17, wherein said hinge pin is fixed to said valve body, and said disk is rotatably mounted to said hinge pin core.

19. The check valve defined in claim 18, wherein said indicator member is attached to said disk.

20. The check valve defined in claim 17, wherein said hinge pin core bore is offset between about 0.050 and 0.150 inches from the longitudinal axis of said hinge pin core.

21. The check valve defined in claim 20, wherein said hinge pin bore is offset between about 0.050 and 0.150 inches from the longitudinal axis of said hinge pin.

22. The check valve defined in claim 17, further comprising a readout device operably attached to said rheostat.

23. The check valve defined in claim 17, wherein said hinge pin core includes a recess at one end, and said indicator member includes a knob at one end that resides within said countersunk recess.

24. The check valve defined in claim 17, wherein said biasing means comprises a counterweight attached to said disk.

* * * * *